(12) United States Patent
Kinn et al.

(10) Patent No.: US 6,696,373 B2
(45) Date of Patent: Feb. 24, 2004

(54) DURABLE HYDROPHILIC NONWOVEN WEBS AND ARTICLES FORMED THEREFROM

(75) Inventors: Larry L. Kinn, Franklin, MA (US); Gregory Neil Henning, Charlotte, NC (US); Clement J. Haley, Mifflinburg, PA (US)

(73) Assignee: BBA Nonwovens Simpsonville, Inc., Simpsonville, SC (US)

( * ) Notice: Subject to any disclaimer, the term of this patent is extended or adjusted under 35 U.S.C. 154(b) by 186 days.

(21) Appl. No.: 09/725,797

(22) Filed: Nov. 29, 2000

(65) Prior Publication Data

US 2001/0008965 A1 Jul. 19, 2001

Related U.S. Application Data

(63) Continuation-in-part of application No. 09/479,694, filed on Jan. 7, 2000, now Pat. No. 6,444,367.
(60) Provisional application No. 60/115,172, filed on Jan. 8, 1999.

(51) Int. Cl.$^7$ .......................... D04H 1/00; D04H 13/00; D04H 3/00; D04H 5/00; D02G 3/00
(52) U.S. Cl. ...................... 442/361; 442/362; 442/364; 442/414; 442/415; 428/373; 428/374
(58) Field of Search ............................... 442/361, 362, 442/364, 414, 415; 428/373, 374

(56) References Cited

U.S. PATENT DOCUMENTS

| | | | | | |
|---|---|---|---|---|---|
| 5,437,418 A | * | 8/1995 | Graef et al. | ............. | 241/152.2 |
| 5,456,982 A | * | 10/1995 | Hansen et al. | ............... | 442/364 |
| 5,458,590 A | * | 10/1995 | Schleinz et al. | ............ | 604/361 |
| 5,643,662 A | * | 7/1997 | Yeo et al. | .................... | 442/364 |

FOREIGN PATENT DOCUMENTS

| | | | | | |
|---|---|---|---|---|---|
| JP | 05106116 A | * | 4/1993 | ........... | D01F/08/06 |

* cited by examiner

*Primary Examiner*—Elizabeth M. Cole
*Assistant Examiner*—Jeremy R. Pierce
(74) *Attorney, Agent, or Firm*—Alston & Bird LLP

(57) ABSTRACT

Nonwoven webs in accordance with the present invention include multicomponent fibers bonded by a multiplicity of bond sites to form a coherent web. The multicomponent fibers include a first component formed of a hydrophobic polypropylene and a second component formed of a blend of a hydrophobic polyolefin and a hydrophilic melt additive. This second component is disposed at the surface of the fibers. The hydrophilic melt additive-modified polyolefin component can be arranged in various configurations in the cross-section of the fiber and the fibers can have various cross sections. For example, the hydrophilic component can occupy a portion of the surface of the fiber, as would occur for example with a side-by-side or segmented pie multicomponent fiber configuration. Alternatively, the modified hydrophilic polyolefin can occupy substantially the entire surface of fiber, as for example by producing the fibers in a sheath core configuration with the hydrophilic modified component forming the sheath. A particularly preferred configuration is a sheath-core bicomponent fiber where the hydrophobic polypropylene forms the core and the modified hydrophilic polyolefin forms the sheath.

27 Claims, No Drawings

DURABLE HYDROPHILIC NONWOVEN WEBS AND ARTICLES FORMED THEREFROM

RELATED APPLICATIONS

This application is a continuation-in-part of application Ser. No. 09/479,694 filed Jan. 7, 2000 now U.S. Pat. No. 6,444,367, which in turn claims the benefit of U.S. Provisional Application No. 60/115,172 filed Jan. 8, 1999, all of which are incorporated herein by reference.

FIELD OF THE INVENTION

The present invention relates to nonwoven webs. More particularly, the invention is directed to nonwoven polyolefin webs which have durable hydrophilic properties and to articles formed from such webs.

BACKGROUND OF THE INVENTION

Polyolefin fibers have been widely used in the nonwovens industry in the manufacture of nonwoven webs, fabrics, and composites. Olefin polymers, such as polyethylene, polypropylene, polybutene, polypentene, and copolymers of ethylene or propylene with other olefinic monomers, are known for their hydrophobic properties. Thus, nonwoven webs of polyolefin fibers are frequently used in applications where their hydrophobic properties are advantageous. For example, polyolefin nonwovens are often used in diapers, other hygiene products and medical applications where it is desired to keep moisture away from a wearer's skin.

However, there are numerous other nonwoven fabric applications where the hydrophobic nature of polyolefin fibers is not required and where hydrophilic properties are desired. If a nonwoven fabric formed of polyolefin fibers is to be used, the fibers must be treated in some way to alter the normally hydrophobic properties of the fibers to impart hydrophilic properties. One well-known practice involves the topical application of compositions, such as surfactants, to render the fabric more hydrophilic. However, topical chemical applications are not entirely satisfactory for some applications, since they are not durable. The hydrophilic property is lost after washing or after extended use. The extra processing steps required for topical chemical treatments or other fiber surface modification treatments also undesirably increase the cost of the fabric. The few processes known to render the polyolefins wettable are environmentally unfriendly, relatively slow and have limited durability.

An alternative to chemical surface modification is to directly melt blend a hydrophilic additive into the thermoplastic polymer rendering the fibers themselves hydrophilic. Published PCT Patent Specification WO99/00447 discloses a product and process for making wettable fibers prepared from an olefin polymer, polyester or polyamide including a wetting agent consisting essentially of a monoglyceride or a combination of a monoglyceride and a mixed glyceride with the monoglyceride amounting to at least 85% by weight in the case of the combination.

The monoglyceride corresponds to the formula

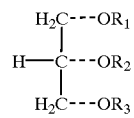

wherein $-OR_1$, $OR_2$, and $-OR_3$ are hydroxyl or a fatty acid ester group, but only one of them is a fatty acid ester group ($C_{12-22}$). The mixed glyceride (di- or tri-) corresponds to the formula

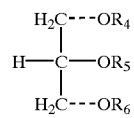

wherein $-OR_4$, $OR_5$, and $-OR_6$ are hydroxyl or a fatty acid ester group ($C_{12-22}$). The combination of this di- or tri-glyceride with the monoglyceride constitutes the wetting agent in accordance with one embodiment.

However, the use of hydrophilic melt additives can add significantly to the cost of the nonwoven webs. Also, the addition of a hydrophilic melt additive to the polyolefin polymer can alter the properties of the fibers or filaments, resulting in unacceptable changes to important physical or aesthetic properties of the nonwoven web, such as strength, softness or hand, for example.

SUMMARY OF THE INVENTION

The present invention overcomes the foregoing limitations and provides a polyolefin nonwoven web which has durable hydrophilic properties, while achieving a highly desirable combination of cost, physical properties and aesthetics.

Nonwoven webs in accordance with the present invention include multicomponent fibers bonded by a multiplicity of bond sites to form a coherent web. The multicomponent fibers include a first component formed of a hydrophobic polypropylene and a second component formed of a blend of a hydrophobic polyolefin and a hydrophilic melt additive. This second component is disposed at the surface of the fibers. The hydrophilic melt additive-modified polyolefin component can be arranged in various configurations in the cross-section of the fiber and the fibers can have various cross sections. For example, the hydrophilic component can occupy a portion of the surface of the fiber, as would occur for example with a side-by-side or segmented pie multicomponent fiber configuration. Alternatively, the modified hydrophilic polyolefin can occupy substantially the entire surface of fiber, as for example by producing the fibers in a sheath-core configuration with the hydrophilic modified component forming the sheath. A particularly preferred configuration is a sheath-core bicomponent fiber where the hydrophobic polypropylene forms the core and the modified hydrophilic polyolefin forms the sheath. Other configurations include non-concentric sheath-core, multi-lobal or tipped cross sections, and islands-in-the-sea cross sections.

The multicomponent fibers may be formed into a nonwoven web using various processing techniques known in the nonwovens industry. For example, the multicomponent fibers may comprise an air-laid web of staple fibers, a carded web of staple fibers, a wet-laid web staple fibers, a web of meltblown fibers or a spunbonded web of substantially continuous filaments or a combination of two or more of these techniques.

There are various melt additives available which can be melt blended with a hydrophobic polyolefin composition to impart durable hydrophilic properties to the polyolefin. Melt additives suitable for the present invention must not undesirably alter the melt-spinability of the multicomponent fibers and should be relatively compatible with the polyolefin composition such that the additive will not prematurely leach out and lose the hydrophilic properties. Certain suitable melt additives useful in the present invention will be at least partially immiscible with the polyolefin polymer composition and will tend to bloom to the fiber surface over time or with application of heat to impart a prolonged hydrophilic surface modification. Particularly suitable are compounds with a molecular structure which includes at least one functional group which is tethered to the olefin polymer structure, with other functional groups which provide reactive hydrophilic sites.

Suitable hydrophilic melt additives for use in the present invention include monomer or dimer fatty acids, hydroxy phenols, polyethylene glycol, fluorohydrocarbons, polyvinyl alcohol and polyvinyl formal.

One particularly suitable class of melt additives is an admixture of hydroxy phenols and polyethylene glycols. The hydroxy phenol is characterized in that it contains the functional group $HOC_6H_4$ —.

Another particularly suitable class of melt additives are monomer and dimer fatty acids having a carbon chain length in the range of 6 to 50, preferably 18 to 36.

According to one embodiment of the invention, the nonwoven web is fabricated employing wet laid and/or carded thermal bonding processes. It is possible to use combinations of hydrophobic and hydrophilic fibers in the web. In other words, all fibers in the web need not be permanently wettable.

In one specific preferred embodiment, the web includes bicomponent fibers in which the melt additive is incorporated into the sheath constituent of the fiber. Use of bicomponent fibers, as well as combinations of hydrophobic and hydrophilic fibers, reduces costs and permits optimization of the web for diverse applications.

Thus, a broad aspect of the present invention is to provide a nonwoven web that has the wettability and strength for use in various end uses (such as rechargeable alkaline batteries, hygiene products, medical products, or filtration products) by directly incorporating hydrophilic melt additives into one or more normally hydrophobic polyolefin components of a multicomponent fiber during melt processing. This fiber can be meltblown, spunbonded or made into staple fibers to form a wettable web. Alternatively the wettable fiber can be mixed with binder fibers that are wettable or non-wettable or mixtures of both which are then made into a nonwoven web.

Another aspect of the invention is to provide a nonwoven web with increased wettability and strength for use as battery separator material. Another broad aspect of the invention is a nonwoven that is durable and wettable in harsh environments.

A further aspect of the invention is a nonwoven web that has both hydrophilic and hydrophobic regions.

Still another aspect of the invention is to provide a method for producing products that can be designed to have varied wettablility and strength properties depending on the desired end use applications.

One specific embodiment of the invention is the provision of a lower cost battery separator material including sheath-core bicomponent fibers, wherein melt additives are incorporated in the sheath of the bicomponent fiber and not the core.

Another specific embodiment of the invention is the provision of an economical battery separator material made of both wettable and non-wettable polymeric fibers.

A still further embodiment of the invention is a nonwoven web that can be used for other applications such as diapers and feminine care products, and medical applications which would require durable wettability.

Another aspect of the invention is to provide a nonwoven web that can be used in clothing applications, wherein products produced remain durable and hydrophilic after multiple machine washings.

Another aspect of the invention is to provide a nonwoven that can be used in filtration applications, wherein durable and wettable properties are required.

The thermoplastic polymeric multicomponent fibers are preferably staple fibers or continuous filaments with a hydrophobic polypropylene component and another component formed of a hydrophobic polyolefin, such as polyethylene or polypropylene, containing a hydrophilic melt additive.

In one of the embodiments of the present invention, the wettable fibers are blended with non-wettable binder fibers. Preferably these binder fibers are polyethylene/polypropylene bicomponent fibers having a polyethylene sheath and a polypropylene core.

In another embodiment of the invention, the nonwoven web includes both non-wettable binder fibers and wettable binder fibers. The wettable binder fibers are preferably polyethylene/polypropylene bicomponent fibers where the hydrophilic melt additive is incorporated into the polyethylene sheath of the bicomponent fiber. The non-wettable binder fibers may comprise polyethylene/polypropylene bicomponent fibers.

In yet another embodiment, the nonwoven web is formed substantially entirely of wettable binder fibers of the type described.

In one suitable embodiment the nonwoven web is 30–90 weight percent of the wettable binder fibers; and 10–70 weight percent of the non-wettable binder fibers. In a more specific embodiment the nonwoven web is 50% wettable binder fiber and 50% non-wettable binder fibers.

In another suitable embodiment the nonwoven web comprises up to 40 weight percent of a wettable fiber matrix; up to 40 weight percent of non-wettable binder fibers; and up to 30 weight percent of the wettable binder fibers. Although specific exemplary ranges are described, any combination of wettable fiber matrix, non-wettable binder fibers and wettable binder fibers are encompassed by the invention with the amounts of each component depending on the desired wettability and strength properties of the resulting web.

In general, battery separator materials formed from nonwoven webs of the invention have enhanced wettability and strength and provide good permeability to gases.

The invention also includes the related process for making nonwoven webs which can be used as battery separators and in other applications which require durability and wettability. In general, wettable multicomponent fibers with at least one hydrophilic melt additive are produced and formed into a nonwoven web by meltblowing, spunbonding other nonwoven formation methods. In one embodiment the fibers are further mixed with binder fibers which are then laid on a papermaking machine to form a wet-laid web. The water is removed from the wet-laid web, thermal bonded and calendered to form the nonwoven.

The nonwoven mats produced, in addition to use as battery separators, can be used in other applications such as absorbent and hygiene products, medical products, clothing and filtration products which require durable wettability and strength.

Other objects, features and advantages of the present invention will become apparent from the following detailed description of the best mode of practicing the invention as follows:

DETAILED DESCRIPTION OF THE INVENTION

The hydrophilic melt additives are incorporated into the thermoplastic olefin polymer and are converted into a nonwoven using any of various forming technologies available for the production of nonwoven webs. The material can be converted directly from the polymer into a nonwoven by spunbonding or meltblowing or a combination of the two. Alternatively, the material may be first formed into fibers and the fibers may thereafter be converted into a nonwoven web by techniques such as wet-laying, air-laying or carding. By combining the melt additives and the nonwoven process, a durably hydrophilic nonwoven web is produced.

In one embodiment of the invention, the hydrophilic melt additives are blended with polypropylene and formed into multicomponent staple fibers to form a wettable fiber matrix. This matrix is then further combined with non-wettable binder fibers and wet-laid to form the nonwoven material of the invention. The non-wettable binder fibers used may also include a bicomponent fiber comprising a polyethylene sheath and a polypropylene core, available as Chisso fibers from Chisso, Japan. The nonwoven material formed has both discrete hydrophobic and hydrophilic regions due to the different types of fibers used in making the web.

In an alternate embodiment the hydrophilic melt additives are blended with bicomponent fibers comprising a polypropylene sheath and a polypropylene core to form the wettable fiber matrix. The bicomponent sheath/core fiber proportions used in the invention may vary over a wide range, with from 50/50 sheath/core to 60/40 sheath/core being exemplary. Essentially the melt additives are incorporated into the outer polypropylene sheath of the fibers. Use of bicomponent fibers having 60/40 sheath/core permit higher incorporation of the melt additive into the sheath portion. The wettable fibers may be then further combined with non-wettable binder fibers to form the nonwoven web.

In all embodiments, the durable hydrophilic web is manufactured by blending a concentrate of hydrophilic melt additives with the thermoplastic polymer and converting the polymer into multicomponent fibers, and a nonwoven fabric directly or through an intermediate fiber formation process. The chemistry and physical properties of the additives, its compatibility with the thermoplastic resin, as well as the process conditions and constructional features of the nonwoven separator are necessary to yield the desired performance. The type of melt additive and proportion are important to the durable wettability of the nonwoven fabric.

In one embodiment, the melt additives used in the invention are selected from the group consisting of monomer and dimer fatty acids having a carbon chain length in the range of 6 to 50, preferably 36. In a preferred composition of this embodiment, the blend contains 2 to 15% Acintol® tall oil fatty acid, Acintol® distilled tall oils (monomer acids) and Sylvadym® dimer acids, which are all commercially available from Arizona Chemical Company, Panama City, Fla. and are fully described in the Technical Data Sheets for these materials, which are incorporated herein by reference. These are polar liquid materials which migrate to the surface of the polyolefin and remain as liquid on the surface thereof. Uniform mixing of the components is important to achieve effective hydrophilic properties.

In another embodiment, the hydrophilic melt additives are fluorohydrocarbons, such as 3M FC 1296. In another embodiment, the melt additives used in the invention are an admixture of hydroxy phenols and polyethylene glycols. Examples of melt additives used are commercially available from Techmer PM, California under the product designations PPM 11211, PPM 11249, PPM 11212, PPM 11267 and PPM 11268. The technical brochures of each of these materials are incorporated herein by reference.

A variety of different melt additive formulations can be used to form the wettable fiber matrix. Specific formulations are illustrated in Examples 1 to 5 herein. In general, the formulas include an active chemical which is an admixture of hydroxy phenols and polyethylene glycols. This active or functional chemical is provided in a carrier resin, preferably polypropylene, of a given melt flow rate (MFR) suitable for meltblowing, spunbonding or staple fiber manufacture. Accordingly, the formulations have different melt flow rates depending on the end use applications. The MFR listed in the formulations below were measured at 230° C., 2.16 kg. Melt blown grade polypropylene resins typically have a much higher melt flow rate (MFR 800–1200), whereas spunbond and staple fiber grade polypropylene resins have a lower melt flow rate (MFR 7–35). The base chemicals in the formulations include durable hydrophilic materials or non-durable hydrophilic materials depending on the desired wettability properties and end use applications.

The non-durable hydrophilic materials provide initial wetting of the fibers to enhance and maximize incorporation of the durable hydrophilic materials. The durable hydrophilic materials impart the wettability and strength properties to the fiber materials. In particular, in battery separator applications, the more durable chemical loaded, absorbency and wicking increase and the longer the life of the battery.

Melt Additive formulations 1 to 5 are illustrative of the types of melt additive formulations used in the invention and shown in Examples 1 to 5.

Melt Additive 1 contains approximately 30% of the active chemical and includes the same durable hydrophilic materials as in Melt Additive formulation 4 but a different melt flow rate. This additive is commercially available as PPM 11211 from Techmer PM, California.

Melt Additive 2 contains approximately 30% of the active chemical and includes the same non-durable hydrophilic materials as in Melt Additive formulation 5 but a different melt flow rate. This additive is commercially available as PPM 11212 from Techmer PM, California.

Melt Additive 3 contains approximately 20% of the active chemical and includes non-durable hydrophilic materials. This additive is commercially available as PPM 11249 from Techmer PM, California.

Melt Additive 4 contains approximately 25% of the active chemical and includes the same durable hydrophilic materials as in Melt Additive formulation 1. This additive has a MFR of 54 grams/10 minutes and is commercially available as PPM 11267 from Techmer PM, California.

Melt Additive 5 contains approximately 20% of the active chemical and includes the same non-durable hydrophilic materials as in Melt Additive formulation 2. This additive has a MFR of 109 grams/10 minutes and is commercially available as PPM 11268 from Techmer PM, California.

For melt blown nonwoven structures, in illustrative applications, Melt Additive formulations 1, 2 and 3 are used. Preferred proportions for melt blown structures include use of 15–35% of Melt Additive 1 formulation, i.e., 4–10% of the active chemical or up to 10% of Melt Additive 2 formulation, i.e., up to 3% of the active chemical. Most preferred proportions for melt blown structures include 30% of Melt Additive formulation 1, i.e. 9% of the active chemical and 5% of Melt Additive 2 formulation, i.e. 1.5% of the active chemical.

For spunbond and nonwoven mats containing staple fibers, in illustrative applications, Melt Additive formulations 4 and 5 are used. Suitable proportions for such structures include use of 15–30% of Melt Additive 4 formulation, i.e., 4–8% of the active chemical or up to 10% of Melt Additive 5 formulation, i.e., up to 2% of the active chemical. More specific exemplary proportions for these structures include 25% of Melt Additive formulation 4, i.e. 6% of the active chemical and 5% of Melt Additive 5 formulation, i.e. 1% of the active chemical. For staple fibers, a preferred proportion includes 20 weight percent of Melt Additive 4 and 2½ weight percent of Melt Additive 5.

The hydrophilic melt additives can be used in the following exemplary forms of nonwovens, namely meltblown, spunbond, SMS (spunbond/meltblown/spunbond), wet-laid, dry-laid or a combination of these forms. Fiber deniers for melt blown structures typically range from 0.1 to 2.0 deniers, with less than 1.0 most preferred. In the case of staple fiber and spunbond filaments deniers, fiber deniers of less than 3.0 are used, but less than 2.0 are most preferred. For spunbond and staple fiber nonwoven structures, in preferred applications Melt Additive formulations 4 and 5 are used.

To understand the present invention more fully, the following examples of the invention are described below. These examples are for purposes of illustration only and this invention should not be considered to be limited by any recitation used therein. The examples demonstrate the preparation of various battery separator materials in accordance with the process of the invention.

As in the examples below, unless otherwise specified, the test procedures for testing electrolyte initial wet out time, retention (absorbency %) and wicking in battery separator fabric are as follows:

Preparation of 31% KOH Solution:
Ingredients:
Distilled water and potassium hydroxide pellets (KOH).
Procedure:
The distilled water is freed of dissolved carbon dioxide by boiling and covering with a watch glass. The boiled water is allowed to cool to room temperature. The solution should be 31% KOH by weight. Since solid KOH contains approximately 10% water, 34.5 g of solid KOH is used for every 100 g of solution required. The solution is made by slowly adding the 34.5 g of KOH to 65.5 g of water.
Wet Out Time
10 ml of 31% potassium hydroxide (KOH) was placed in a five inch watch glass. One ⅝" diameter disc sample was placed on the surface of the KOH. The time in seconds was recorded for initial wet out time up to 120 secs. These measurements were taken of the sample "as is" (WET OUT BEFORE) and of the sample after 7 days aging in the 31% KOH (WET OUT AFTER). The average time in seconds was reported for the samples. In some examples, the samples were only aged for 5 days.

Electrolyte Retentively (Absorbency %)
Retentively refers to the amount of potassium hydroxide solution that will be retained by a specimen. Values are obtained by determining the amount of solution of KOH that is retained by a specimen soaked in the solution.

specifically, three (3) specimens from each sample are cut (such that the "V" shaped portion of the die runs in the MD direction). The specimens are conditioned by drying in an oven at 70° C. (158° F.) for 1 minute, removed from the oven, and conditioned to the lab environment for 15 minutes prior to testing.

Each specimen of the fabric is weighed ("dry weight") and then is soaked in a 31% solution of KOH. The amount of solution retained by the specimen is measured after 1 hour. The specimen is removed, allowed to drip for 10 minutes, and weighed and recorded as "wet weight". The percent retention is calculated using the following formula:

$$\frac{(\text{Weight weight} - \text{Dry weight})}{(\text{Dry weight} \times 100)} = \% \text{ Retention}$$

Electrolyte Absorbing (Wicking)
Wicking refers to the ability of a fabric to absorb a liquid through capillary action. Wicking values are obtained by determining the distance a solution of potassium hydroxide (KOH) is absorbed (wick) by a fabric specimen held vertically.

Specifically, three (3) specimens from each sample are cut 1" CD×7" MD. The specimens are conditioned by drying in an oven at 70% (158° F.) for 1 minute, removed from the oven, and conditioned to the lab environment for 15 minutes prior to testing. Each specimen of the fabric is suspended vertically in a 31% solution of KOH and the distance the liquid is absorbed by the specimen is measured after 30 minutes.

Alkali Proof Character
A pre-weighed specimen of the fabric is soaked in a 31% solution of potassium hydroxide (KOH) for 7 days at a temperature of 70° C. (158° F.) and then re-weighed to determine weight loss. This method is used to determine the effects on the fabric when subjected to a long term exposure in a solution of KOH, at an elevated temperature.

Specifically, three (3) specimens from each sample are cut 2" CD×8" MD. The specimens are conditioned by drying in an oven at 70° C. (158° F.) for 1 minute, removed from the oven, and conditioned to the lab environment for 15 minutes prior to testing. Each specimen of the fabric is weighed and then submerged in the KOH solution and soaked for 7 days. After 7 days the samples are removed and rinsed thoroughly with distilled water to remove all the KOH solution (6 or 7 times in a beaker with distilled water). The specimens are dried and re-weighed to determine weight loss.

EXAMPLE 1

A wettable battery separator material was prepared from a mixture of a wettable fiber matrix and non-wettable binder fibers.

In Samples 1, 2 and 3 the wettable fiber matrix used is a bicomponent fiber comprised of a polypropylene sheath and a polypropylene core. Combinations of Melt Additive formulations 4 and 5 were incorporated into the polypropylene sheath with essentially none of the additives migrating to the fiber core. The bicomponent fibers are 1.5 denier×½ inch and are obtainable from Fiber Inovation Technologies, Johnson City, Tenn.

Specifically in Samples 1, 2 and 3, 20% of the melt additive (30% active material) was incorporated into the polypropylene sheath (6% active material). The proportion of sheath/core in the bicomponent fiber is 50/50, thus the amount of active material in the total fiber was 3%.

The non-wettable binder fibers comprised a bicomponent fiber having a polyethylene sheath and a polypropylene core. The binder fibers are 2.0 denier×5 mm and are available as Chisso fibers from Chisso, Japan.

In each sample 50% of the wettable fiber matrix was mixed with 50% of the non-wettable binder fibers. The fiber mixture was dispersed and wet-laid to form the nonwoven substrates. The substrates were evaluated after calendering for absorbency, wicking and wet-out to KOH. The tests were also done after 7 days exposure to KOH at 70° F. The results are summarized in Table I below.

TABLE I

| SAMPLE | BASIS WT. gsy | THICKNESS mils | ABSORB. % BEFORE/ AFTER | WICKING mm BEFORE/ AFTER | WET-OUT sec BEFORE/ AFTER | WT. LOSS % |
|---|---|---|---|---|---|---|
| 1 | 27.09 | 4.52 | 230.8/ 247.6 | 13 | 3 | 50.18/ 6 min 58 sec | 0.123 |
| 2 | 26.26 | 3.6 | 193.6/ 213.7 | 19 | 3 | 55/ 4 min 29 sec | 0.862 |
| 3 | 44.24 | 6.12 | 237.8/ 261.1 | 13 | 4 | Lmin 40 sec/ 8 min 4 sec | 0.333 |

EXAMPLE 2

A wettable battery separator material was prepared from a mixture of a wettable fiber matrix and non-wettable binder fibers.

In Samples 4, 5 and 6 the wettable fiber matrix used is a bicomponent fiber comprised of a polypropylene sheath and a polypropylene core. The proportion of sheath/core in the bicomponent fiber is 60/40. Combinations of Melt Additive formulations 4 and 5 were incorporated into the polypropylene sheath. The bicomponent fibers are 1.5 denier ×½ inch and are produced by Fiber Innovations Technologies, Johnson City, Tenn. In particular the samples were as follows.

Sample 4 the fiber sheaths are 77.5% 12 mfr polypropylene, 20% Melt Additive 4 and 2.5% Melt Additive 5. The fiber core is 18 mfr polyproylene.

Sample 5 the fiber sheaths are 73.55% 12 mfr polypropylene, 24%. Melt Additive 4 and 2.5% Melt Additive 5. The fiber core is 18 mfr polyproylene.

Sample 6 the fiber sheaths are 71.50% 12 mfr polypropylene, 26% Melt Additive 4 and 2.5% Melt Additive 5. The fiber core is 18 mfr polypropylene.

In Samples 4, 5 and 6, 50% of the wettable fiber matrix were combined with 50% of non-wettable binder fibers comprised of a bicomponent fiber having a polyethylene sheath and a polypropylene core. The binder fibers are 2.0 denier×5 mm available as Chisso fibers from Chisso, Japan.

Sample 7 was prepared from a mixture of a wettable fiber matrix and a wettable binder fiber. The wettable fiber matrix used is a polypropylene staple fiber containing combinations of Melt Additive formulations 4 and 5. The polypropylene staple fibers are 1.8 denier×12 mm and are available from American Extrusion. The wettable binder fiber is a bicomponent fiber wherein the fiber sheath is 77.5% low density polyethylene, 20% Melt Additive 4 and 2.5% Melt Additive 5. The fiber core is 18 mfr polypropylene. The binder bicomponent fibers are 1.5 denier×½ inch and are obtainable from Fiber Innovation Technologies, Johnson City, Tenn.

As a positive control, 50% of the non-wettable bicomponent binder fibers having a polyethylene sheath and a polypropylene core (Chisso fibers) were mixed with 50% of a polypropylene fiber matrix (American Extrusion fibers) without melt additives. The fiber furnish mixtures in each sample was dispersed and wet-laid to form the nonwoven substrates.

The handsheets were evaluated after calendering for absorbency, wicking and wet-out to KOH. The tests were also done after 5 days exposure to KOH at 70° F. The results are summarized in Table II below.

TABLE II

| SAMPLE | STRIP TENSILE lbs/1" | Initial WICK mm | Initial ABSORB. % | 5 days WICK mm | 5 days ABSORB. % |
|---|---|---|---|---|---|
| CONTROL | 3.58 | 70 | 257 | 75 | 237 |
| 4 | 4.06 | 84 | 338 | 82 | 370 |
| 5 | 4.07 | 73 | 283 | 80 | 308 |
| 6 | 3.95 | 72 | 305 | 91 | 357 |
| 7 | 1.43 | 68 | 302 | 78 | 378 |

As illustrated in Table II the tensile and absorbency of the handsheet samples increased. The strength and wettability of the nonwovens remained even after aging. These results indicate that the separate properties of tensile and absorbency can be provided in a nonwoven. In addition, nonwovens are produced that have both increased tensile and absorbency.

EXAMPLE 3

A wettable battery separator material was prepared from a mixture of a wettable fiber matrix, non-wettable binder fibers and wettable binder fibers.

In Samples 8 and 9 the wettable fiber matrix used is a bicomponent fiber comprised of a polypropylene sheath and a polypropylene core. The proportion of sheath/core in the bicomponent fiber is 60/40. Combinations of Melt Additive formulations 4 and 5 were incorporated into the polypropylene sheath. The bicomponent fibers are 1.8 denier ×½ inch and are obtainable from Fiber Innovation Technologies, Johnson City, Tenn.

The non-wettable binder fibers are bicomponent fibers having a polyethylene sheath and a polypropylene core. The binder fibers are 2.0 denier×5 mm and are commercially available as Chisso fibers from Chisso, Japan.

The wettable binder fibers used are bicomponent fibers comprised of a polyethylene sheath and a polypropylene core.

Combinations of Melt Additive formulations 4 and 5 were incorporated into the polyethylene sheath. The bicomponent fibers are 1.6 denier×½ inch and are obtainable from Fiber Innovation Technologies, Johnson City, Tenn.

The fiber furnish in each of the samples were as follows.

| Sample 8 | 40% wettable fiber matrix; 40% non-wettable binder fiber; and 20% wettable binder fiber |
| --- | --- |
| Sample 9 | 30% wettable fiber matrix; 30% non-wettable binder fiber; and 40% wettable binder fiber |

The fiber furnish mixtures in each sample was dispersed and wet-laid to form the nonwoven substrates. The substrates were evaluated after calendering for absorbency, wicking and wet-out to KOH. The tests were also done after 7 days exposure to KOH at 70° F. The results are summarized in Tables III and IV below.

TABLE III

| SAMPLE | BASIS WT. gsm | MD TENSILE kg/50 mm | CD TENSILE kg/50 mm | AIR PERMEABILITY cfm | AIR PERMEABILITY CM3/cm3/s |
| --- | --- | --- | --- | --- | --- |
| 8 | 59.4 | 11.2 | 6.3 | 84.2 | 42.4 |
| 9 | 57.4 | 9.7 | 5.6 | 134.8 | 68.9 |

TABLE IV

WETTABILITY BEFORE AND AFTER AGING

| | BEFORE | | AFTER | | |
| --- | --- | --- | --- | --- | --- |
| SAMPLE | ABSORB % | WICKING mm | ABSORB % | WICKING mm | ALKALI PROOF % loss |
| 8 | 226.8 | 85.3 | 237.9 | 93 | 0.67 |
| 9 | 297.2 | 79.3 | 333.9 | 100.7 | 0.5 |

In still another embodiment of the present invention, nonwoven webs are produced by wet-laying a blend of lower denier non-wettable binder fibers and higher denier wettable binder fibers. For example, 10 to 90 weight percent of the wettable binder fibers described in EXAMPLE 3 may blended with 90 to 10 weight percent of 0.7 one-half inch long non-wettable polyethylene/polypropylene sheath-core binder fibers. The lower denier fibers provide enhanced uniformity to the web. For a higher basis weight sheet on the order of 55 gsm, about 20 weight percent of the non-wettable fibers is preferred. For a sheet on the order of about 30 gsm, about 30 weight percent of the non-wettable binder fibers is preferred. These sheets are suitable for use as battery separators or for other applications, such as an ink-receptive inkjet printing substrate.

It is known that current nylon based battery separators degrade in the presence of the potassium hydroxide electrolyte. The nonwoven mats of the present invention present a replacement for the nylon based battery separators by providing separator materials that have been made permanently wettable, or if desired only partially wettable. Polypropylene is naturally hydrophobic. Known methods to make polypropylene wettable involves surface grafting of acrylic acid by ultraviolet radiation or by other surface modification methods such as plasma which are slow and expensive.

For fibrous battery separator applications the polypropylene needs to be resistant to the KOH and exhibit permanent wettability throughout the life of the product. Wettability is quantified by contact angle measurements in the case of a film and additionally by the rate of wicking and % absorbency in the case of a fibrous web used as the battery separator.

The process of the present invention provides advantages over prior practice by providing a nonwoven having both hydrophilic and hydrophobic regions as opposed to hydrophilic topical treatments. Additional wettability is achieved with incorporation of the surfactant that has more resistance to KOH solution than surfactants used in the prior art. Increased wettability is achieved simultaneously with an increase in strength. The wettability claimed in the invention is permanent and durable in a KOH solution as opposed to the prior art.

Finally, variations from the examples given herein are possible in view of the above disclosure. Therefore, although the invention has been described with reference to certain preferred embodiments, it will be appreciated that other processes may be devised, which are nevertheless within the scope and spirit of the invention as defined in the claims appended hereto.

The foregoing description of various and preferred embodiments of the present invention has been provided for purposes of illustration only, and it is understood that numerous modifications, variations and alterations may be made without departing from the scope and spirit of the invention as set forth in the following claims.

What is claimed is:

1. A polyolefin nonwoven web having durable hydrophilic properties and formed of polyolefin fibers, said web comprising multicomponent fibers and a multiplicity of bond sites bonding said fibers, said multicomponent fibers including a first component formed by a hydrophobic polypropylene and a second component formed of a blend of a hydrophobic polyolefin and a hydrophilic melt additive, wherein said hydrophilic melt additive is a mixture of hydroxy phenols and polyethylene glycols, said second component being disposed at the surface of said fibers.

2. The web according to claim 1, wherein substantially the entire surface of said multicomponent fibers is formed from said second component.

3. The web according to claim 2, wherein said multicomponent fibers comprise sheath-core bicomponent fibers, and wherein said first component forms the core and said second component forms the sheath.

4. The web according to claim 3, wherein said second component is a blend of polypropylene with said hydrophilic melt additive.

5. The web according to claim 3, wherein said second component is a blend of polyethylene with said hydrophilic melt additive.

6. The web according to claim 5, wherein said web additionally includes sheath-core bicomponent fibers which have a hydrophobic polyethylene sheath component and a hydrophobic polypropylene core component.

7. The web according to claim 1, wherein said multicomponent fibers comprise an air-laid web of staple fibers, a carded web of staple fibers, a wet-laid web of staple fibers, a web of meltblown fibers or a spunbonded web of substantially continuous filaments.

8. A diaper including a nonwoven web having durable hydrophilic properties according to claim 1.

9. A feminine hygiene product including a nonwoven web having durable hydrophilic properties according to claim 1.

10. An article of apparel comprising a nonwoven web having durable hydrophilic properties according to claim 1.

11. A filter including a filtration medium comprising a nonwoven web having durable hydrophilic properties according to claim 1.

12. A filter according to claim 11, wherein said nor woven web forms a membrane support, and including an ultrafiltration membrane carried by said nonwoven web membrane support.

13. A polyolefin nonwoven web having durable hydrophilic properties and formed of polyolefin fibers, said web comprising sheath-core bicomponent fibers and a multiplicity of bond sites bonding said fibers, the core component of aid bicomponent fibers comprising a hydrophobic polypropylene and the sheath component of said bicomponent fiber comprising a blend of a hydrophilic polypropylene and a hydrophilic melt additive, wherein said hydrophilic melt additive is a mixture of hydroxy phenols and polyethylene glycols.

14. The web according to claim 13, wherein said sheath component forms at least 50 percent by weight of the fibers.

15. The web according to claim 13, wherein said bond sites comprise discrete spaced apart thermal point bonds bonding said bicomponent fibers to one another.

16. The web according to claim 13, wherein said bicomponent fibers are staple fibers and said web is a carded thermal bonded web.

17. The web according to claim 13, wherein said bicomponent fibers are continuous filaments and said web is a spunbonded web.

18. A polyolefin nonwoven web having durable hydrophilic properties and comprising a blend of non-wettable sheath-core bicomponent polyolefin fibers and wettable sheath-core bicomponent polyolefin fibers, said non-wettable fibers having a polyethylene sheath component and a polypropylene core component, and said wettable fibers having a sheath component formed of a blend of polyethylene with a hydrophilic melt additive, wherein said hydrophilic melt additive is a mixture of hydroxy phenols and polyethylene glycols, and a polypropylene core component.

19. The web according to claim wherein said non-wettable bicomponent fibers are of a lower denier than said wettable bicomponent fibers.

20. The web according to claim 18, wherein said web comprises from 10 to 90 weight percent of said non-wettable fibers and from 90 to 10 weight percent of said wettable fibers.

21. A composite fabric comprising a polyolefin nonwoven web having durable hydrophilic properties and formed of polyolefin fibers, and at least one additional layer bonded to said polyolefin nonwoven web, said nonwoven web being formed of polyolefin fibers and comprising multicomponent fibers, said multicomponent fibers including a first component formed by a hydrophobic polypropylene and a second component formed of a blend of a hydrophobic polyolefin and a hydrophilic melt additive, wherein said hydrophilic melt additive is a mixture of hydroxy phenols and polyethylene glycols, said second component being disposed at the surface of said fibers.

22. A composite fabric according to claim 21, wherein said at least one additional layer includes an additional nonwoven web.

23. A composite fabric according to claim 21, wherein said at least one additional layer includes a film.

24. A nonwoven web having durable hydrophilic properties comprising sheath-core bicomponent fibers and a multiplicity of bond sites bonding said fibers, the core component of said bicomponent fibers comprising a hydrophobic polypropylene and the sheath component of said bicomponent fiber comprising a blend of a hydrophobic polyolefin and a hydrophilic melt additive, wherein said hydrophilic melt additive is a mixture of hydroxy phenols and polyethylene glycols.

25. A nonwoven web having durable hydrophilic properties comprising multicomponent fibers, said multicomponent fibers comprising a first component formed by a hydrophobic polypropylene and a second component disposed at the surface of said fibers and formed of a blend of a hydrophobic polyethylene and a hydrophilic melt additive, said hydrophilic melt additive comprising a mixture of hydroxy phenols and polyethylene glycols.

26. A carded thermal bonded polyolefin nonwoven web having durable hydrophilic properties, said web consisting essentially of carded staple fibers and a multiplicity of bond sites bonding said fibers to form a coherent web, said web comprising multicomponent fibers including a first component formed by a hydrophobic polypropylene and a second component formed of a blend of a hydrophobic polyolefin and a hydrophilic melt additive, wherein said hydrophilic melt additive is a mixture of hydroxy phenols and polyethylene glycols, said second component being disposed at the surface if said fibers.

27. A spunbonded polyolefin nonwoven web having durable hydrophilic properties, said web consisting essentially of randomly arrange continuous filaments and a multiplicity of bond sites bonding said filaments to form a coherent web, said web comprising multicomponent filaments including a first component formed by a hydrophobic polypropylene and a second component formed of a blend of a hydrophobic polyolefin and a hydrophilic melt additive, wherein said hydrophilic melt additive is a mixture of hydroxy phenols and polyethylene glycols, said second component being disposed at the surface of said filaments.

\* \* \* \* \*

UNITED STATES PATENT AND TRADEMARK OFFICE
CERTIFICATE OF CORRECTION

PATENT NO.     : 6,696,373 B2
DATED          : February 24, 2004
INVENTOR(S)    : Kinn et al.

It is certified that error appears in the above-identified patent and that said Letters Patent is hereby corrected as shown below:

Title page,
Item [56], References Cited, U.S. PATENT DOCUMENTS, insert the following:

| | | |
|---|---|---|
| 3,811,957 | 05-21-1974 | Buntin |
| 3,847,676 | 11-12-1974 | Palmer et al. |
| 3,870,567 | 03-11-1975 | Palmer et al. |
| 3,918,995 | 11-11-1975 | Palmer et al. |
| 3,933,525 | 01-20-1976 | Palmer et al. |
| 3,947,537 | 03-30-1976 | Buntin et al. |
| 3,972,759 | 08-03-1976 | Buntin |
| 4,165,352 | 08-21-1979 | Volkman |
| 4,298,668 | 11-03-1981 | Schmidt et al. |
| 4,438,185 | 03-20-1984 | Taskier |
| 4,440,838 | 04-03-1984 | Schmidt |
| 4,732,825 | 03-22-1988 | Kamata et al. |
| 5,093,197 | 03-03-1992 | Howard et al. |
| 5,126,219 | 06-30-1992 | Howard et al. |
| 5,180,647 | 01-19-1993 | Rowland et al. |
| 5,230,843 | 07-27-1993 | Howard et al. |
| 5,230,949 | 07-27-1993 | Howard et al. |
| 5,389,471 | 02-14-1995 | Kung |
| 5,439,734 | 08-08-1995 | Everhart et al. |
| 5,492,781 | 02-20-1996 | Degen et al. |
| 5,700,600 | 12-23-1997 | Danko et al. |

UNITED STATES PATENT AND TRADEMARK OFFICE
CERTIFICATE OF CORRECTION

PATENT NO.    : 6,696,373 B2
DATED         : February 24, 2004
INVENTOR(S)   : Kinn et al.

It is certified that error appears in the above-identified patent and that said Letters Patent is hereby corrected as shown below:

Title page (cont'd),
Item [56], References Cited, FOREIGN PATENT DOCUMENTS, insert the following

| EP | 0 438 114 | B1 | Kimberly-Clark Corp. | 07-24-1991 |
|----|-----------|----|----------------------|------------|
| EP | 0 450 449 | B1 | Daiwaboseki Co., Ltd. | 10-09-1991 |
| EP | 0 591 616 | B1 | Firma Carl Freudenberg | 04-13-1994 |
| EP | 0 597 224 | A2 | Kimberly-Clark Corp. | 05-18-1994 |
| FR | 2 712 612 |    | Textiles et Plastiques Chomarat | 05-24-1995 |
| EP | 0 680 107 | B1 | Kabushiki Kaisha Toshiba | 11-02-1995 |
| EP | 0 756 340 | A1 | Pall Corporation | 01-29-1997 |
| EP | 0 795 916 | A1 | Asahi Kasei Kogyo Kabushiki Kaisha | 09-17-1997 |
| EP | 0 834 938 | A2 | Japan Vilene Company, Ltd. | 04-08-1998 |

| WO | 98/23809 |  | Lintrend Developments Limited | 06-04-1998 |
|----|----------|--|-------------------------------|------------|
| WO | 98/27263 |  | E.I. DuPont De Nemours and Company | 06-25-1998 |
| WO | 98/28477 |  | Moy Isover Limited | 07-02-1998 |
| WO | 98/31060 |  | Daramic, Inc. | 07-16-1998 |
| WO | 99/00447 |  | Techmer PM | 01-07-1999 |

Column 13,
Line 41, after "claim" insert -- 20 --.

Signed and Sealed this

Ninth Day of November, 2004

JON W. DUDAS
*Director of the United States Patent and Trademark Office*